United States Patent [19]

Gilson

[11] 4,404,815
[45] Sep. 20, 1983

[54] AIR CONDITIONING ECONOMIZER CONTROL METHOD AND APPARATUS

[75] Inventor: John D. Gilson, Bridgeport, N.Y.

[73] Assignee: Carrier Corporation, Syracuse, N.Y.

[21] Appl. No.: 323,799

[22] Filed: Nov. 23, 1981

[51] Int. Cl.³ .................. F25D 17/00; G05D 23/00
[52] U.S. Cl. ............................ 62/180; 62/196 A; 236/1 EA; 236/49; 236/91 E
[58] Field of Search ............... 62/180, 196 A, 228 C; 165/16, 28; 236/49, 1 EA, 91 R, 91 D, 91 E

[56] References Cited

U.S. PATENT DOCUMENTS

| | | | |
|---|---|---|---|
| 4,245,481 | 1/1981 | McDermott | 236/49 |
| 4,267,967 | 5/1981 | Beck et al. | 236/49 |
| 4,270,362 | 6/1981 | Lancia et al. | 62/182 |
| 4,272,966 | 6/1981 | Niemann et al. | 165/16 |
| 4,293,027 | 10/1981 | Tepe et al. | 165/16 |
| 4,347,712 | 9/1982 | Benton et al. | 236/49 |

*Primary Examiner*—Albert J. Makay
*Assistant Examiner*—Harry Tanner
*Attorney, Agent, or Firm*—Donald F. Daley; Robert P. Hayter

[57] ABSTRACT

An air conditioning economizer control method and apparatus for integrating the operation of the economizer with an air conditioning system is disclosed. An economizer position control arrangement is further disclosed incorporating a rotor locking circuit for maintaining the damper in position against a bias applied by mechanical means such as a spring. A multiple position indicator or multiple temperature sensor is utilized to modulate the position of the damper utilizing the motor for opening the damper, a spring for returning the damper and a rotor locking circuit for maintaining the damper in position. Multiple temperature sensors are also disclosed for making effective use of outdoor air when cooling through economizer operation is available. Staged cooling loads relative to outdoor ambient temperatures are utilized to select the appropriate mode of operation.

9 Claims, 2 Drawing Figures

AIR CONDITIONING ECONOMIZER CONTROL METHOD AND APPARATUS

BACKGROUND OF THE INVENTION

1. Field of the Invention

The present invention relates to air conditioning apparatus and a method of control. More particularly, the present invention concerns integration of an economizer with the operation of an air conditioning unit including means for modulating the damper regulating air flow through the economizer.

2. Description of the Prior Art

A typical air conditioning system having a vapor compression refrigeration circuit includes various components such as a compressor, condenser, evaporator and expansion device. These components are arranged to transfer heat energy between a fluid in heat transfer relation with the evaporator and a fluid in heat transfer relation with a condenser. To provide cooling to an enclosure heat energy is rejected in an outdoor coil serving as a condenser and heat energy is absorbed at the indoor coil serving as an evaporator. This heat energy is absorbed from the air being supplied to the enclosure such that air at a reduced temperature is provided.

It is known in the air conditioning industry to provide an air conditioning unit which is suitable for being mounted on a roof or otherwise adjacent to the enclosure to be conditioned. This unit is typically divided into an indoor section having an indoor heat exchanger and an outdoor section having an outdoor heat exchanger. An indoor fan is mounted within the indoor section for supplying conditioned air to the enclosure. The indoor fan draws this air both from the enclosure as return air and from the ambient as makeup air. The air entering the indoor section is passed in a heat exchange relation with the indoor heat exchanger wherein either heat energy is absorbed from the air flowing therethrough or heat energy is rejected to said air. Consequently the air being supplied to the enclosure is conditioned within the indoor section of the air conditioning unit.

The outdoor section of the unit is arranged such that heat energy may be transferred between the outdoor heat exchanger and the ambient air flowing therethrough. Typically, an outdoor fan is provided to circulate the air through the outdoor heat exchanger. The compressors of a typical system are located within the outdoor section.

It has been found advantageous to utilize air conditioning systems incorporating economizers. As used herein, the term economizer shall refer to that portion of an air conditioning unit adapted to draw ambient air into the indoor section of the unit for supply to the enclosure. It is desirable to circulate outdoor air to the enclosure when its temperature and humidity is such that cooling of the enclosure may be accomplished without operating the refrigeration circuit of the air conditioning unit or may be accomplished utilizing cool ambient air and simultaneously operating the refrigerant circuit.

Utilization of an economizer requires that sufficient volumes of air be circulated such that air may be drawn into the unit through the economizer and thereafter circulated to the enclosure. A sufficient volume of return air must also be circulated back to the air conditioning unit from the enclosure. Under some conditions, a power exhaust fan, return air fan or discharge opening may be utilized such that the return air from the enclosure is discharged to the ambient. Hence, any cooling effected in this mode of operation is caused by the substitution of cool outdoor ambient air for the existing indoor air. The temperature of the outdoor air, as compared to the temperature of the enclosure, is typically the critical factor involved in determining whether it is more cost effective to effect cooling by circulation of ambient air into the enclosure as opposed to operation of the refrigeration circuit.

The invention as disclosed herein concerns controls for integrating the operation of an economizer and vapor compression refrigeration circuit for supplying cool air to an enclosure in the most cost effective manner. The control circuit further concerns the incorporation of circuits to modulate dampers to provide the correct amount of outdoor air to maintain the appropriate return air temperature to the enclosure.

SUMMARY OF THE INVENTION

It is an object of the present invention to provide an air conditioning system utilizing outdoor ambient air.

It is a further object of the present invention to provide a control system for incorporating economizer operation with a vapor compression refrigeration circuit for effectively supplying cool air to an enclosure.

It is another object of the present invention to provide an apparatus and method for modulating the position of damper blades in an economizer.

It is a further object of the present invention to provide a safe, economical and reliable control system for regulating the operation of an air conditioning system.

These and other objects will be apparent from the description to follow and from the appended claims.

These objects are achieved according to the preferred embodiment of the present invention by the utilization of a control circuit for integrating economizer operation with the operation of the compressor of an air conditioning system to effect cooling of an enclosure. The air conditioning system includes a two stage indoor thermostat for sensing both a first stage cooling load and a second stage cooling load. A second ambient thermostat is provided to close at a second threshhold temperature and a first ambient thermostat is provided to open at a first lower threshhold temperature. A first circuit is provided for energizing the economizer to allow ambient air to enter the enclosure when the ambient air temperature is below the first threshhold temperature upon a first stage cooling load being detected. A second circuit means for energizing the economizer upon the ambient air temperature being above the first threshhold temperature and below the second threshhold temperature upon a first stage cooling load being detected and for energizing the compressor simultaneously with the economizer upon a second stage cooling load being detected is provided. A third circuit means acts to energize the compressor upon a first stage cooling load being detected and the ambient temperature exceeding the second threshhold temperature. An additional compressor may be energized when the control circuit detects a second stage cooling need and the ambient temperature exceeds the second threshhold level.

An economizer control for regulating the flow of ambient air into the space to be conditioned includes means for defining an air flow path, damper means for controlling the air flow therethrough, spring means for biasing the damper towards the closed position, motor means for biasing the damper towards the open position and motor locking means for electrically locking the motor means in position to maintain this damper in position notwithstanding the spring means. Both switches for determining a vent position and sensing means for determining operating positions are provided for appropriately energizing either the motor means or the motor locking means to maintain the damper in the appropriate position.

DESCRIPTION OF THE PREFERRED EMBODIMENT

The preferred embodiment herein will be described with particular reference to a unitary rooftop type air conditioning unit. It is to be understood that the application of this economizer and damper control scheme is not limited to this particular type of air conditioning equipment or to an application of the exact nature as described. It is further to be understood that although specific switching and sensing parameters are disclosed other equivalent parameters or means may be utilized for accomplishing the same functions.

Figure 2:
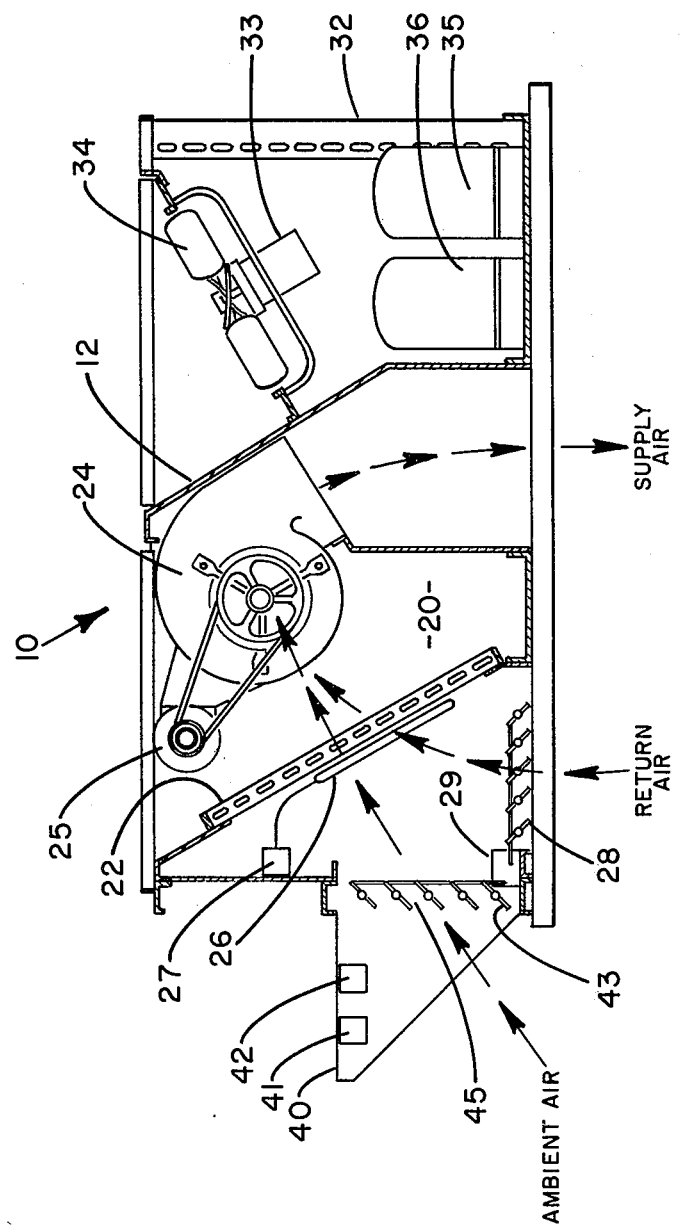
FIG. 2 is a plan type view of a rooftop type air conditioning unit disclosing an economizer and damper arrangement.

Referring first to FIG. 2, there may be seen a rooftop type air conditioning unit 10 divided by partition 12 into indoor section 20 and outdoor section 30,. Outdoor section 30 includes outdoor heat exchanger 32, compressors 35 and 36 and outdoor fan 34 powered by outdoor fan motor 33. Indoor section 20 includes indoor heat exchanger 22, indoor fan 24 powered by indoor fan motor 25 and mixed air thermostat 27 having mixed air capillary 26 for sensing the temperature of the air entering the indoor heat exchanger.

Economizer section 40 is shown having compressor lockout switch 41 and outdoor ambient temperature sensor 42 located to sense the temperature of the ambient air. Economizer damper 43 is shown for regulating air flow into the unit through economizer opening 45. Return damper 28 is shown for regulating return air flow to the unit. Motor 29 is connected to both return damper 28 and economizer damper 43 for simultaneously regulating the position of each damper. A spring located within motor 29 is connected to bias the dampers such that the return air damper is maintained in the open position and the economizer damper is maintained in the closed position.

Air flow into and about the indoor section of the unit is shown by arrows. Return air is supplied from the bottom of the unit upwardly and ambient air is supplied from the side of the unit through the economizer section. These two air flow streams mix in the area where the air temperature is sensed by the mixed air thermostat capillary 26 and then the air flows through the indoor coil into indoor fan 24. From the fan the air is discharged downwardly and returned to the enclosure through the bottom of the unit and indicated to be the supply air flow. Heating means may additionally be provided for supplying heat energy to the supply air. This unit is described as a heat pump capable of reverse cycle operation for heating the air supplied to the enclosure. Additional heating means would be supplemental heaters in a unit which serves as a heat pump or the primary heating means in a unit that does not have reverse cycle capabilities.

Figure 1:
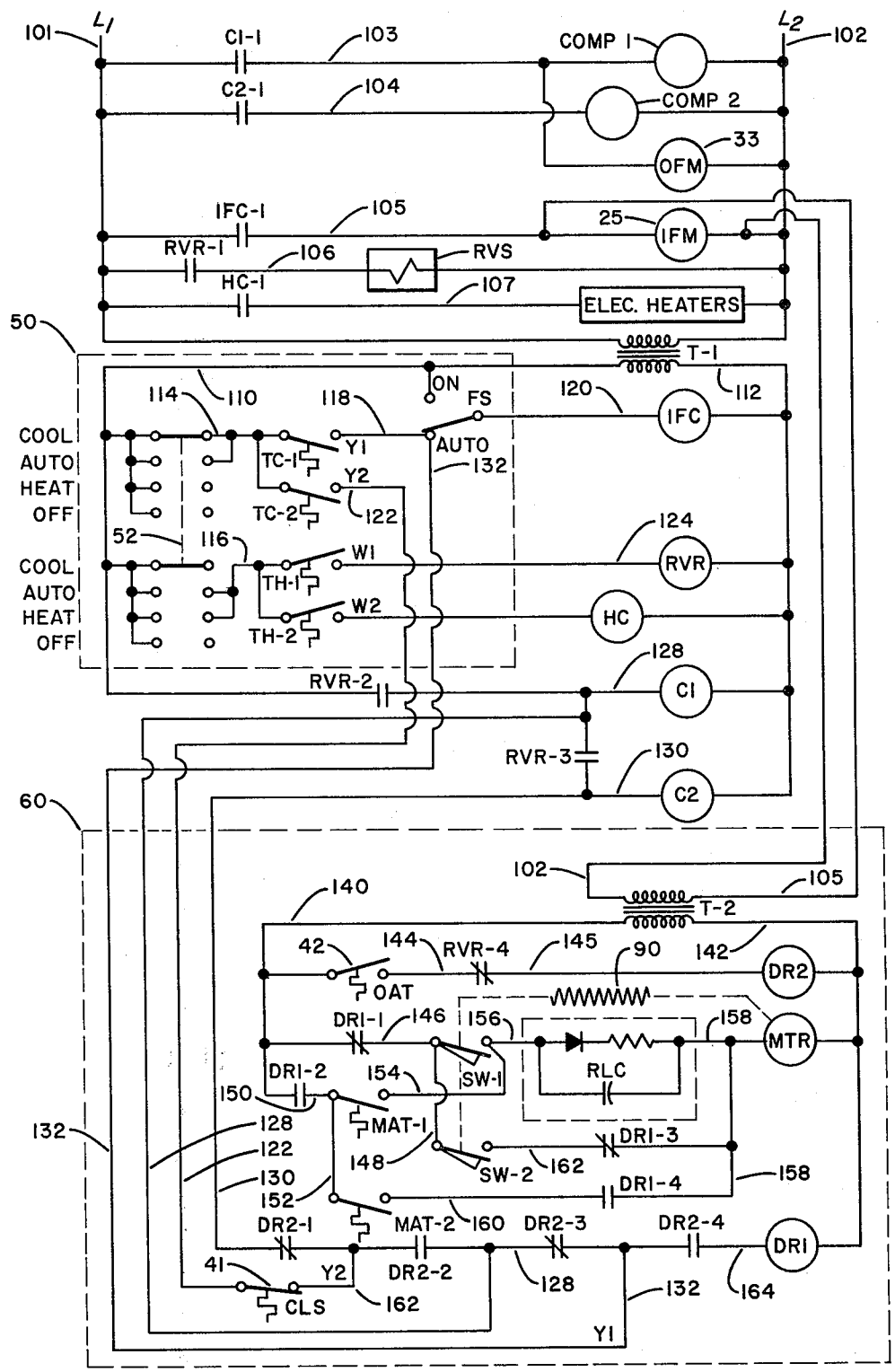
FIG. 1 is a schematic wiring diagram of an air conditioning unit incorporating an economizer control.

Referring now to FIG. 1 there may be seen a wiring schematic for this unit. Power is supplied to the unit at lines L-1 and L-2. Line L-1, designated as wire 101, is connected to normally open first compressor relay contacts C1-1 and second compressor or relay contacts C2-2, indoor fan relay contacts IFC-1, reversing valve relay contacts RVR-1, heating contactor contacts HC-1 and the primary winding of transformer T-1. Line L-2, designated as wire 102 is connected to first compressor motor COMP-1, second compressor motor COMP-2, outdoor fan motor OFM and indoor fan motor IFM, reversing valve solenoid RVS, to the electric heaters and to the primary winding of transformer T-2. Wire 103 connects first compressor relay contacts C1-1 with first compressor motor COMP-1 and outdoor fan motor OFM. Wire 104 connects second compressor relay contacts C2-1 with second compressor motor COMP-2.

Wire 105 connects normally open indoor fan relay contacts IFC-1 with indoor fan motor 25 and with the primary transformer T-2. Wire 107 connects heating contactor contacts HC-1 with the electric heaters.

A thermostat portion of the diagram, that portion within the dotted lines labelled as thermostat 50, includes numerous temperature sensing devices. Specifically, power is supplied to wire 110 connected to the secondary winding of transformer T-1 and to multiple portions of mode switch 52. Mode switch 52 has cool, auto, heat and off positions for selecting the mode in which the unit is to be operated. Wire 110 is connected to the power side of the mode switch and is connected to fan switch FS and normally open reversing valve relay contacts RVR-2. The upper portion of mode switch 52 has the cool and auto positions connected by wire 114 to the first stage cooling thermostat TC-1 and to second stage cooling thermostat TC-2. Wire 116 connects the auto and heat portions of the bottom half of mode switch 52 to the first stage heating thermostat TH-1 and the second stage heating thermostat TH-2.

First stage cooling thermostat TC-1 is connected by wire 118 to fan switch FS. Fan switch FS is connected by wire 132 to second damper relay normally closed contacts DR2-3 and second damper relay normally open contacts DR2-4 of the economizer control portion 60 of this wiring diagram. Wire 122 is connected to the second stage cooling thermostat TC-2 and to compressor lockout switch CLS or 41. Wire 124 connects the first stage heating thermostat to reversing valve relay RVR. Wire 126 connects the second stage heating thermostat TH-2 to heating contactor relay HC. Wire 120 connects fan switch FS and indoor fan contactor IFC. Wire 128 connects normally open reversing valve relay contacts RVR-2 with normally open reversing valve relay contacts RVR-3, first compressor relay C-1, and with normally open second damper relay contacts DR2-2 and normally closed second damper relay contacts DR2-3. Wire 130 connects normally open reversing valve relay RVR-3 contacts with second compressor relay C-2 and normally closed second damper relay contacts DR2-1.

Within economizer control portion 60 of the wiring schematic there can be seen a transformer T-2 connected by wires 105 and 102 such that the transformer is energized when indoor fan motor 25 is energized. The secondary of transformer T-2 is connected to wires 140 and 142. Wire 140 is also connected to the outdoor air thermostat OAT (42) to normally closed first damper relay contacts DR1-1 and to normally open first damper relay contacts DR1-2. Wire 142 is connected to second damper relay DR2, to motor MTR and to first damper relay DR1. Wire 144 connects outdoor ambient thermostat OAT or 42 to normally closed reversing valve relay contacts RVR-4 and wire 145 connects normally closed RVR-4 contacts to second damper relay DR2. Wire 146 connects normally closed first damper relay contacts DR1-1 to switch SW-1. Wire 148 connects switch SW-1 to switch SW-2. Switch SW-1 is connected by wire 156 to rotor locking circuit RLC which is connected by wire 158 to motor MTR and to normally closed first damper relay contacts DR1-3 and normally open first damper relay contacts DR1-4. Wire 162 connects switch SW-2 with normally closed first damper relay contacts DR1-3. Wire 150 connects normally open first damper relay contacts DR1-2 with mixed air thermostat first stage MAT-1. Mixed air thermostat first stage MAT-1 is connected by wire 152 to the second stage MAT-2 of the mixed air thermostat and by wire 154 to wire 156. Wire 160 connects second stage MAT-2 of the mixed air to the normally open first damper relay contacts DR1-4.

Wire 162 connects compressor lockout switch CLS to normally closed second damper relay contacts DR2-1 and to normally open second damper relay contacts DR2-2. Wire 164 connects normally open second damper relay contacts DR2-4 to the first damper relay DR1.

Spring 90 is shown in a dotted line connection between motor MTR and switches SW-1 and SW-2. (Spring 90 physically connects the rotor of the motor to the motor frame.) Switches SW-1 and SW-2 are mounted within motor MTR which is displaced by spring 90 unless the motor or the rotor locking circuit is energized. The rotor locking circuit includes a diode and resistor in series and a capacitor in parallel therewith. When energized the rotor locking circuit prevents the rotor from turning thereby maintaining the damper in the selected position notwithstanding the bias applied by spring 90.

Operation

In the heating mode of operation, upon a first stage heating need being sensed, first stage thermostat TH-1 closes and energy is supplied to reversing valve relay RVR. Reversing valve relay contacts close such that energy is supplied to the indoor fan contactor IFC and also to first compressor contactor C-1 and second compressor contactor C-2. The various compressor contacts being energized act to energize the two compressors, the outdoor fan motor and reversing valve solenoid.

Upon indoor fan contactor IFC energizing first indoor fan contactor contacts IFC-1, indoor fan motor 25 is energized and power is supplied via wires 102 and 105 to transformer T-2. The secondary of transformer T-2 then supplies power to normally closed first damper relay contacts DR1-1 and to switches SW-1 and SW-2. Switches SW-1 and SW-2 are arranged to determine the displacement of the damper. At this point, since the unit is in the heating mode of operation, it is anticipated that the damper will be only open to a vent position to allow the required amount of outdoor air to be mixed with the indoor air. For this vent position the two switches are preset to open and close upon a given amount of displacement. The displacement between the switches is spaced slighly such that they open and close at different angular displacement. Motor MTR acts to open the damper whereas spring 90, shown by a dotted line, acts to close the damper. Rotor locking circuit RLC, including a diode and resistor in series and capacitor parallel therewith, acts to maintain the motor in position against the bias of the spring when energized.

Hence, as power is supplied upon startup, switches SW-2 and SW-1 are closed and power is supplied through wire 162, through normally closed first damper relay contacts DR1-3, through wire 158 to the motor. The motor is then operated until switch SW-2 opens breaking contact. Switch SW-1 is arranged to remain closed until a small displacement occurs after switch SW-2 opens. In the closed position, switch SW-1 energizes rotor locking circuit RLC maintaining the motor in that position. When power is no longer being supplied directly to the motor through switch SW-2, the rotor locking circuit, if energized, will act to maintain the motor in position. A stall region is provided between the point where switch SW-2 opens and switch SW-1 opens, this region being the acceptable limit within which the damper may rotate while still being in the vent position. Should the damper overshoot while opening, the switch SW-1 will open allowing the dampers to rotate toward the closed position via the bias of the spring until switch SW-1 closes energizing the rotor locking circuit maintaining the dampers in position. Should the dampers manage to close further, switch SW-2 will close energizing the motor to rotate the dampers to a more open position. Hence, this combination of switches with the rotor locking circuit and motor acts to maintain the dampers within the stall region as defined by the switch positions.

During heating operation normally closed reversing valve relay contacts RVR-4 open preventing second damper relay DR-2 from being energized. Hence, the dampers will be maintained in the vent position rather than an economizer position during heating.

Switching now to the cooling mode of operation it may be seen upon a first stage cooling need being sensed, wire Y1 is energized. The fan is energized simultaneously therewith acting to supply power to the economizer control through transformer T2. Assuming the ambient temperature is sufficiently high, such as above 80° F., outdoor ambient temperature thermostat OAT will open and power will not be supplied to second damper relay DR2. Power will be supplied through normally closed first damper relay contacts DR1-1 to switches SW-1 and SW-2 to maintain the damper in the vent position when the outdoor ambient temperature level detected is above a second threshhold level as detected by the outdoor ambient thermostat. The first damper relay is not energized since the power being supplied through wire Y1 cannot pass through the normally open second damper relay DR2-4 contacts to energize first damper relay DR1.

Should the temperature be sufficiently low that the outdoor ambient thermostat OAT is closed then the second damper relay will be energized and the second damper relay contacts DR2-4 will be closed energizing first damper relay DR1. Once the first damper relay is energized than the normally open first damper relay contacts DR1-2 are closed supplying power to mixed air thermostat MAT and the normally closed first damper relay contacts DR1-1 are opened discontinuing power to the switch contacts SW-1 and SW-2. Once the first damper relay is energized the economizer may no longer be operated in the vent position. In this position, with the outdoor ambient thermostat closed, the temperature of the outdoor ambient air is such that ambient air may be drawn into the enclosure to provide cooling.

The mixed air thermostat senses the combined temperature of the return air and the ambient air just prior to that air entering the indoor coil of the air conditioning unit. The mixed air thermostat incorporates two thermal sensing devices, the second stage MAT-2, connected to energize the damper motor to open the damper and the first stage MAT-1, connected to energize the rotor locking circuit to maintain the damper in position. Typically, the lower temperature level may be set at 50° F. and a higher temperature level set at 54° F. Hence, if the temperature sensed is above 54° F. the both the MAT-1 and MAT-2 contacts will be closed and consequently power will be supplied through MAT-2 contacts through wire 160, through the now closed first damper relay contacts DR1-4 to motor MTR to further open the damper to allow more outdoor air to enter. Once the temperature of the mixed air drops to 54° the second stage of the mixed air thermostat opens discontinuing further motor operation and the rotor locking circuit is energized.

Upon a further drop in temperature below the setpoint of the first stage of mixed air thermostat MAT-1, the rotor locking circuit will be de-energized and the spring will act to close the damper. The rotor locking circuit will be de-energized until the mixed air temperature increases to the MAT-1 setpoint. Hence, it can be seen that this combination of mixed air thermostat elements acts to create a modulation of the damper element such that the appropriate amount of ambient air is allowed to enter the unit to maintain the temperature of the air in the indoor section of the unit within the appropriate range.

Should a second stage cooling need be sensed by sensing element TC-2 closing, power will be supplied through wire 122 or Y-2. This supply of power will be entirely ineffective if compressor lockout switch CLS is open. The compressor lockout switch is designed to close at a temperature level less than the temperature level at which outdoor ambient thermostat OAT closes such that compressors are maintained de-energized if there is cooling available from the outdoor air. If the outdoor air temperature is above the temperature at which the compressor lockout switch closes, such as 60° F., then power is supplied through wire 162 to either first compressor relay C1 through normally closed second damper relay contacts DR2-1 if the outdoor ambient thermostat is open or through second damper relay contacts DR2-2 to first compressor relay C1 if outdoor ambient thermostat OAT is closed energizing the second damper relay.

From the above description of the operation of the unit it may be seen that upon a first stage cooling need being detected, the compressor lockout switch is ineffective. If the outdoor ambient thermostat switch is open then the economizer may only be operated in a vent position. If the outdoor ambient thermostat is closed than a first stage cooling need will act to energize the economizer with the damper blades modulating. Upon a second stage cooling need being detected, if the compressor lockout switch is open, then only the economizer will be operated. If the compressor lockout switch is closed and the outdoor ambient switch is closed then the economizer is operated in response to a first stage cooling need being detected and the first compressor is operated in response to a second stage cooling load. If the outdoor ambient thermostat is open and the compressor lockout switch is closed then the first compressor is operated when a first stage cooling need is detected and the second compressor is operated when a second stage cooling need is detected.

While the above invention has been described with reference to a particular embodiment thereof it is to be understood that variations and modifications can be effected within the spirit and scope of the invention.

What is claimed is:

1. A control circuit for integrating economizer operation with operation of a compressor of an air conditioning system to effect cooling of an enclosure, said air conditioning system including a two stage thermostat for sensing a first stage cooling load and a second stage cooling load which comprises:
a second ambient thermostat set to close at a second threshhold temperature;
a first ambient thermostat set to close at a first threshhold temperature lower than the second threshhold temperature;
first circuit means for energizing the economizer to allow ambient air to enter the enclosure when the ambient air temperature is below the first threshhold temperature upon a first stage cooling load being detected;
second circuit means for energizing the economizer upon the ambient air temperature being above the first threshhold temperature and below the second threshhold temperature upon a first stage cooling load being detected and for energizing the compressor simultaneously with the economizer upon a second stage cooling load being detected; and
third circuit means for energizing the compressor upon a first stage cooling load being detected and the ambient temperature exceeding the second threshhold temperature.

2. The apparatus as set forth in claim 1 wherein the air conditioning system includes a second compressor and the control circuit comprises means for energizing the second compressor in response to a second stage cooling need being detected when the ambient temperature exceeds the second threshhold level.

3. The apparatus as set forth in claim 1 wherein the second ambient thermostat is an outdoor air thermostat and further including a second damper relay connected to be energized when the outdoor air thermostat senses a temperature below the second threshhold level and wherein second damper relay contacts are connected to energize the economizer if the second damper relay is energized or the compressor if the second damper relay is not energized.

4. The apparatus as set forth in claim 3 wherein the first ambient thermostat is a compressor lockout thermostat which opens when the ambient temperature is below a first threshhold temperature and which is connected to the thermostat to prevent a second stage cooling need from energizing a compressor if the temperature sensed by the compressor lockout switch is below the first threshhold level.

5. The apparatus as set forth in claim 4 wherein additional second damper relay contacts are positioned to connect the compressor lockout thermostat to the second compressor if the second damper relay is not energized and to the first compressor if the second damper relay is energized.

6. A method of coordinately controlling an economizer combined with an air conditioning system having a vapor compression refrigeration circuit including at least one compressor, a two stage thermostat for determining cooling needs, at least one outdoor thermostat and an indoor fan for circulating air to the enclosure to be conditioned which comprises the steps of:

energizing the indoor fan when a first stage cooling need is detected by the thermostat;

energizing the economizer when a first stage cooling need is detected and the outdoor ambient temperature is below a second threshhold temperature;

energizing the compressor of the refrigeration circuit in response to a first stage cooling need when the ambient temperature is above a second threshhold temperature; and energizing the compressor of the refrigeration circuit in response to a second stage cooling need when the ambient temperature is above a first threshhold temperature which is lower than the second threshhold temperature.

7. The method as set forth in claim 6 wherein the refrigeration circuit includes a second compressor and further comprising the step of energizing the second compressor when a second stage cooling need is detected and when the ambient temperature is above the second threshhold temperature.

8. The method as set forth in claim 7 wherein the economizer includes an economizer damper and wherein the step of energizing the economizer includes displacing the economizer damper to regulate the flow of ambient air into the enclosure.

9. The method as set forth in claim 8 wherein the step of energizing the economizer includes displacing the economizer damper to a vent position when the ambient temperature exceeds the seccond threshhold temperature.

* * * * *